(12) United States Patent
Stubbs

(10) Patent No.: US 8,172,491 B1
(45) Date of Patent: May 8, 2012

(54) MOTORCYCLE TIE-DOWN SYSTEM

(76) Inventor: Kent A. Stubbs, Red Bluff, CA (US)

( * ) Notice: Subject to any disclaimer, the term of this patent is extended or adjusted under 35 U.S.C. 154(b) by 176 days.

(21) Appl. No.: 12/697,059

(22) Filed: Jan. 29, 2010

Related U.S. Application Data

(60) Provisional application No. 61/148,947, filed on Jan. 31, 2009.

(51) Int. Cl.
*B60P 7/08* (2006.01)
*B60P 7/00* (2006.01)

(52) U.S. Cl. .................. 410/3; 410/23; 410/97

(58) Field of Classification Search ........... 410/3, 97, 410/23, 2, 10, 11, 96; 224/402, 403, 412, 224/413, 924
See application file for complete search history.

(56) References Cited

U.S. PATENT DOCUMENTS

| | | | |
|---|---|---|---|
| 5,326,202 A | 7/1994 | Stubbs | |
| 5,476,349 A * | 12/1995 | Okland | 410/106 |
| 6,171,034 B1 * | 1/2001 | Burgoon et al. | 410/3 |
| 6,231,285 B1 * | 5/2001 | Elwell et al. | 410/107 |
| 6,524,041 B1 * | 2/2003 | Voiculescu | 410/100 |
| 6,705,811 B1 | 3/2004 | Selby | |
| 6,715,972 B2 | 4/2004 | Jackson, Sr. | |
| 6,761,519 B2 | 7/2004 | Alderman | |
| 6,805,522 B2 | 10/2004 | Condon | |
| 6,932,550 B1 | 8/2005 | Hope | |
| 6,966,732 B2 | 11/2005 | Gohata | |
| 7,025,549 B1 | 4/2006 | Vandament et al. | |
| 7,578,646 B2 | 8/2009 | Shaw | |
| 7,901,169 B2 * | 3/2011 | Slocum | 410/97 |
| 2006/0186162 A1 | 8/2006 | Stubbs | |

* cited by examiner

*Primary Examiner* — Glenn Dayoan
*Assistant Examiner* — Sunsurraye Westbrook
(74) *Attorney, Agent, or Firm* — William Bodnar

(57) ABSTRACT

A strapping system for positioning and transporting a motorcycle or similar vehicle in an upright position include two interconnected straps with reinforced cuffs. The cuffs have a cylindrical body and strap attachment housing contiguously formed and a reinforcement ring substantially enclosed within the walls of the cylindrical body and strap attachment housing.

12 Claims, 2 Drawing Sheets

MOTORCYCLE TIE-DOWN SYSTEM

CROSS REFERENCE TO RELATED APPLICATIONS

This application claims priority from U.S. Provisional Patent Application No. 61/148,947 filed Jan. 31, 2009. The contents of U.S. Provisional Patent Application 61/148,947 are incorporated herein by reference.

FIELD OF THE INVENTION

This present invention relates to a strapping system for securing motorcycle or similar vehicle in an upright position for transport.

BACKGROUND OF THE INVENTION

Motorcycles are two wheeled vehicles that vary in size and shape depending on the model. However, there is general similarity in the shape of motorcycles, which allows embodiments of the present invention to be applicable to different models of motorcycles and other vehicles of similar shape.

During transport of a motorcycle the forces incurred vary greatly, both in severity and direction, depending upon various factors. These include road conditions, driving habits, construction and condition of the vehicle used for transport, and the user's understanding of the various methods of securing a motorcycle for transport.

One of the present strapping systems includes tying a motorcycle down with two separate ropes, one from each handlebar, which cause excessive wearing of motorcycle parts such as handlebar covering and gas tank paint. This method is also inherently difficult as it requires balancing the tension equally on the different tie downs.

Another strapping system includes two interconnected straps with soft cuffs engaging the grips of the handlebar. This method reduces the damage to the handlebar covering and gas tank paint. However, the soft cuff design of the system allows handlebar grips to be exposed to a lateral pull that sometimes resulted in an inward "bunching" of the grips if the grips are not sufficiently glued to the throttle tube (on the right side) and handlebar (on the left side). In addition, under certain conditions this strapping system would contact with switch gear (horn, turn signal, and start buttons) causing unnecessary wearing of motorcycle parts.

Yet another strapping system includes hard cuffs that are susceptible to failure due to exposure from the elements. The new improved motorcycle tie down system and method for transport of motorcycles provides solutions to these problems inherent in the related art.

SUMMARY OF THE INVENTION

The present invention provides a new and improved strapping system for securing motorcycles for transport in a vertical upright position, which also reduces damage during the transport and provides greater motorcycle stability. Embodiments of the present invention overcome certain undesirable properties inherent in the related art, while providing better overall results.

The embodiment of the invention comprises two identical securing straps that are connected to a cuff on one end and have a sewn loop on the other end. The sewn loop is useful for attaching the hook of a tie-down strap which is then attached to the towing or hauling vehicle. Two straps can be interconnected in such a way that they represent mirror images of one another.

This invention uses a molded cuff (rather than a soft cuff sewn from fabric as in known designs). The molded cuff incorporates a closed end which acts as a "stop" to prevent the cuff from migrating inward under tension and either "bunching" the grips or contacting any switchgear. The molded cuff can also incorporate "ribs" that reinforce the closed end of the cuff. This provides added strength to the cuff and helps keep the cuff intact. It can also further prevent "bunching" of the grips.

Each cuff contains a strap attachment housing that allows engagement of securing straps. The strap attachment housing provides a reinforced attachment device for one strap and provides a pathway between the strap attachment housing and the cylindrical portion of the cuff through which the second strap may pass. The orientation of the cuffs in use on a vehicle allows one end of a securing strap to be attached to the housing portion of the cuff and the other end of the strap passes through the slot in the opposing cuff (between the housing and cylindrical body).

The cuff also incorporates a support ring that at least partially is embedded into the cylindrical body of the cuff and the body of the strap attachment housing. The support ring does not have to be contained solely within the raised boss sections of the cylindrical cup and the strap attachment housing. The position of the support ring with respect to the strap attachment housing and cylindrical cup is unique. In addition, the latest technologies in plastics are being incorporated in the design of the molded cuffs to ensure resistance to breakage, distortion, and UV degradation to improve the quality of service and extend the service life of this securing strap system. The support ring is typically made of metal but is not limited to a metallic composition.

BRIEF DESCRIPTION OF DRAWINGS

The invention is illustrated in the following drawings.

DETAILED DESCRIPTION OF THE PREFERRED EMBODIMENTS

Figure 1:
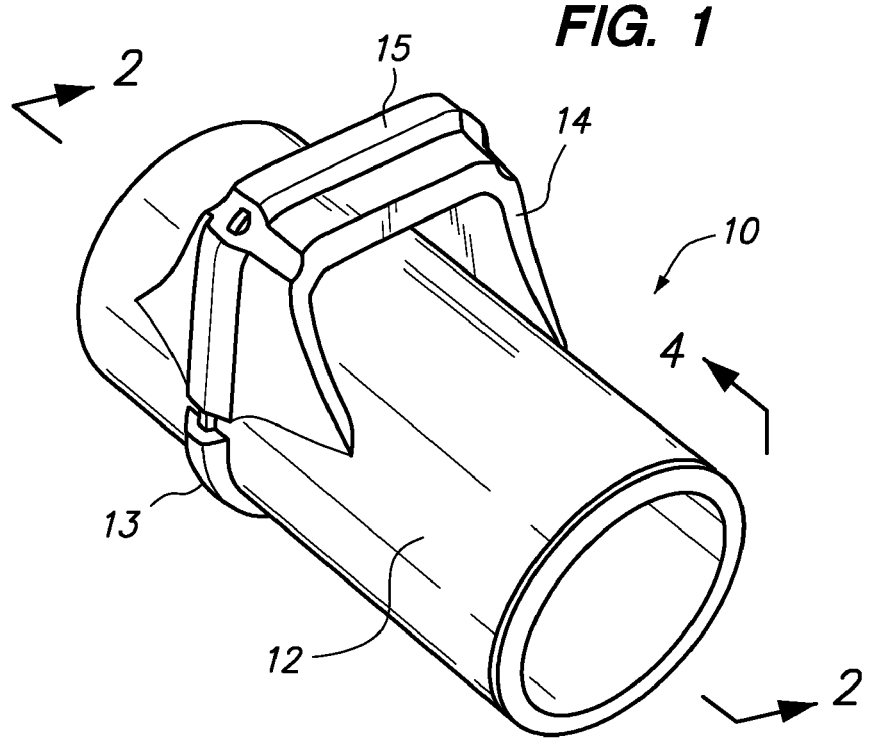
FIG. 1 schematically shows a single molded grip cuff with an opening at one end.

Referring to FIG. 1, which shows the general features of a preferred embodiment of the invention, the grip cuff 10 is comprised of a cylindrical cup 12 and a strap attachment housing 14. The strap attachment housing includes a raised boss section 15. The cylindrical body also includes a raised boss section 13.

Figure 2:
FIG. 2 is a section view of a cuff showing the metal ring imbedded into the cylindrical body of the cuff and the cuff strap attachment housing.
Figure 2:
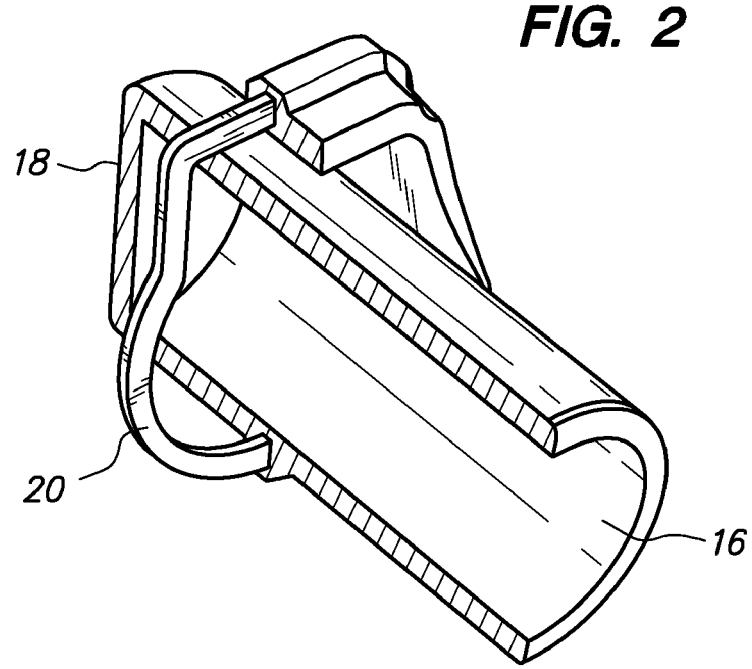

FIG. 2 is a cutaway section view that shows the open end 16 of the cuff cylinder and the closed end 18. A metal ring 20 is encased within the grip cuff structure as shown.

Figure 3:
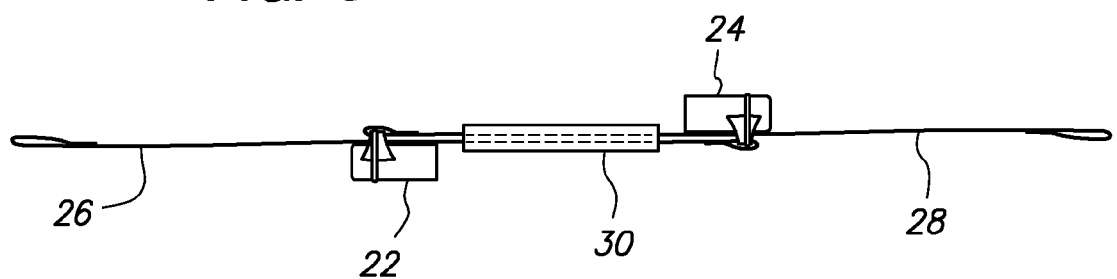
FIG. 3 is a schematic view of two grip cuffs incorporated into the motorcycle tie-down system of the present invention.

FIG. 3 shows a strapping system in accordance with present invention. A first grip cuff 22 is shown interconnected with a second grip cuff 24. The strapping system includes a first securing strap 26 that passes through the aperture in the first grip cuff 22 and is connected to the strap attachment housing of the second grip cuff 24. Both securing straps pass through an anti-chaffing guard 30 that is a padded tube that protects against chaffing damage. In operation, both grip cuffs will have the same orientation with the cylindrical cup on the top and the strap attachment housing underneath. Strap crossing can occur within the anti-chaffing guard.

Figure 4:
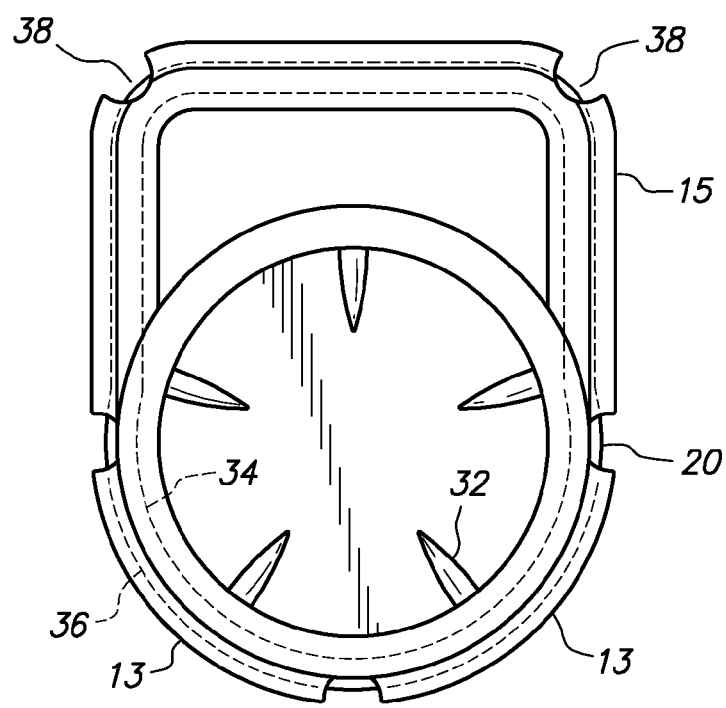
FIG. 4 presents a view of a grip cuff from the open end of the cuff.

FIG. 4 is a view of a grip cuff from the open end 16 of the cylinder. The interior of the closed end of the cylinder can contain reinforcing ribs 32 to keep the closed end intact. The support ring 20 is visible at several cutout sections 38 of the device. These exposed sections of the support ring are typically coated for protection. The dotted lines represent the approximate position of the support ring 20 within the grip cuff. There is adequate cuff material between the inside edge 34 of the ring and the inside edge of the cylindrical cup as well as between the inside edge of the ring and the inside edge of the strap attachment housing 14.

Similarly there is adequate and substantial cuff material between the outside edge 36 of the support ring and the outside edge of the cylindrical body and the strap attachment housing with the exception of the small cutaway areas 38. The raised sections of the cylinder and strap attachment housing in the vicinity of the support ring are referred to as the boss area(s) and are clearly shown in the drawings. The cylindrical cup boss section 13 and the strap attachment housing boss section 15 are shown in FIGS. 1 and 4. Cutouts 38 in the boss sections provide view sites for verification of the existence of the support ring 20.

CONCLUSIONS, OTHER EMBODIMENTS, AND SCOPE OF INVENTION

The support ring is typically made of metal but non-metallic support rings may be applicable. When metal support rings are utilized, sections of the support rings that are not enclosed by the cuff can be protected by a coating of suitable material. The tie-down cuffs are made from suitable moldable materials. If raised boss sections are utilized on the strap attachment housing and cylindrical body components, breaks in the boss section are typically included.

The above description presents the best mode contemplated in carrying out my invention. However, it is susceptible to modifications and alternate constructions from the embodiments shown in the drawings and accompanying description. Consequently it is not intended that the invention be limited to the particular embodiments disclosed. On the contrary, the invention is intended to cover all modifications, sizes and alternate constructions falling within the spirit and scope of the claimed invention or the equivalents thereof.

What is claimed is:

1. A reinforced motorcycle tie-down cuff comprising:
   a cylindrical body closed at one end;
   a strap attachment housing contiguously formed with the cylindrical body in a substantially perpendicular relationship with the cylindrical body near the closed end of the cylindrical body; and
   a reinforcement ring substantially enclosed within the walls of the cylindrical body and the strap attachment housing.

2. The reinforced motorcycle tie-down cuff of claim 1 formed in a molding process.

3. The reinforced motorcycle tie-down cuff of claim 1 further including a number of reinforcement ribs contiguously formed about the inside wall of the cylindrical body and the closed end.

4. The reinforced motorcycle tie-down cuff of claim 1 wherein the reinforcement ring is metallic.

5. The reinforced motorcycle tie-down cuff of claim 1 wherein the strap attachment housing and the cylindrical body have a raised, boss section.

6. The reinforced motorcycle tie-down cuff of claim 5 wherein the reinforcing ring is at least partially enclosed by the boss sections of the strap attachment housing and cylindrical body.

7. A tie-down assembly for a motorcycle comprising:
   a first tie-down cuff having a cylindrical body closed at one end, a strap attachment housing contiguously formed with the cylindrical body near the closed end of the cylindrical body, and a reinforcement ring substantially enclosed within the walls of the cylindrical body and the strap attachment housing;
   a second tie-down cuff identical to the first tie-down cuff;
   a first securing strap attached at one end to the first tie-down cuff, the other end of the first securing strap threaded between the strap attachment housing and cylindrical body of the second tie-down cuff; and
   a second securing strap attached at one end to the second tie-down cuff, the other end of the second securing strap threaded between the strap attachment housing and cylindrical body of the first tie-down cuff, the first and second tie-down cuffs positionable opposite one another on the tubular ends of the motorcycle handlebars, the free ends of the first and second securing straps attachable to tie-down straps secured to a transport vehicle.

8. The tie-down assembly of claim 7 wherein the first and second tie-down cuffs are formed in a molding process.

9. A method for securing a motorcycle to a transport vehicle in an upright position comprising the steps:
   (a) placing a first tie-down cuff having a cylindrical body closed at one end, a strap attachment housing contiguously formed with the cylindrical body near the closed end of the cylindrical body, and a reinforcement ring substantially enclosed within the walls of the cylindrical body and the strap attachment housing over a first tubular end of a motorcycle handlebar;
   (b) placing a second tie-down cuff having a cylindrical body closed at one end, a strap attachment housing contiguously formed with the cylindrical body near the closed end of the cylindrical body, and a reinforcement ring substantially enclosed within the walls of the cylindrical body and the strap attachment housing over a second tubular end of a motorcycle handlebar;
   (c) attaching a first securing strap to the strap attachment housing of the first tie-down cuff threading the open end of the first securing strap between the strap attachment housing and the cylindrical body of the second tie-down cuff;
   (d) attaching a second securing strap to the strap attachment housing of the second tie-down cuff threading the open end of the second securing strap between the strap attachment housing and the cylindrical body of the first tie-down cuff,
   (e) with the motorcycle positioned upright on the transport vehicle, securing the free ends of the first and second securing straps to a first and second tie-down strap provided on the transport vehicle; and
   (f) tightening the straps to secure the motorcycle in an upright position on the transport vehicle.

10. The method of claim 9 wherein in steps (a) and (b) the first and second tie-down cuffs are formed in a molding process.

11. The method of claim 9 wherein in steps (c) and (d) the open ends of the first and second securing straps are further threaded through an anti-chaffing tube provided for the purpose.

12. The method of claim 9 wherein in steps (c) and (d) the open ends of the first and second securing straps are folded over and sewn to form loops for convenient attachment to the first and second tie-down straps.

* * * * *